Oct. 17, 1944.  G. W. VON HOFE ET AL  2,360,630
CLUTCH
Filed Nov. 12, 1941  4 Sheets-Sheet 1

INVENTORS
GEORGE W. VON HOFE
PAUL A. KETCHPEL
BY
ATTORNEY

Oct. 17, 1944.    G. W. VON HOFE ET AL    2,360,630
CLUTCH
Filed Nov. 12, 1941    4 Sheets-Sheet 3

INVENTORS
GEORGE W. VON HOFE
PAUL A. KETCHPEL
BY
ATTORNEY

Oct. 17, 1944.                G. W. VON HOFE ET AL                2,360,630
                                    CLUTCH
                          Filed Nov. 12, 1941          4 Sheets-Sheet 4
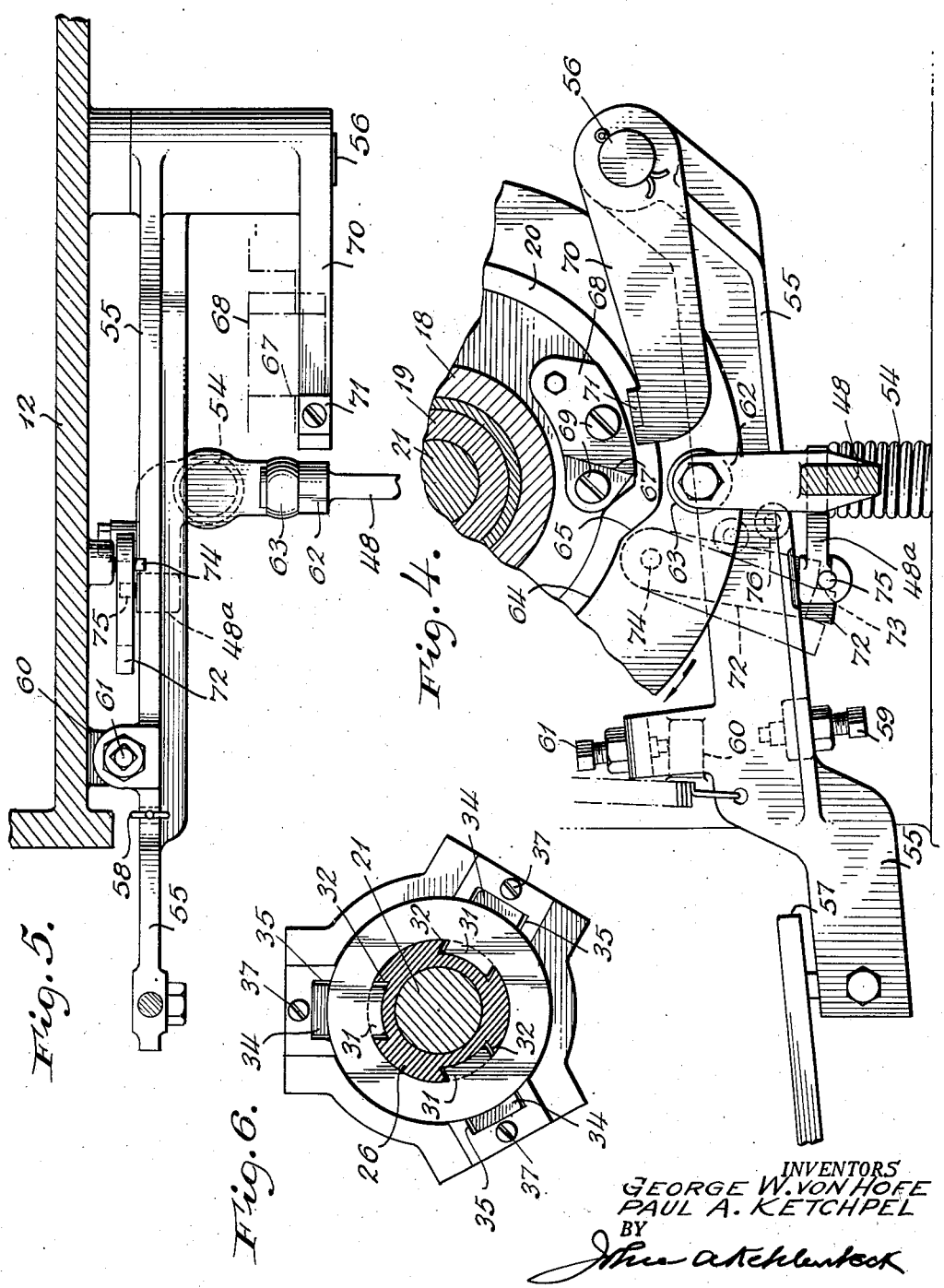
INVENTORS
GEORGE W. VON HOFE
PAUL A. KETCHPEL
BY
ATTORNEY Patented Oct. 17, 1944

2,360,630

UNITED STATES PATENT OFFICE 2,360,630

CLUTCH

George W. von Hofe, Bound Brook, and Paul A. Ketchpel, West Englewood, N. J., assignors to New Jersey Machine Corporation, Hoboken, N. J., a corporation of New Jersey Application November 12, 1941, Serial No. 418,662

5 Claims. (Cl. 192—33)

The invention relates to clutches and has for its object to provide a novel single revolution clutch of the friction disc type, the disengagement of which is automatically controlled in such a manner that the operation of a mechanically associated driven element will always be arrested at a predetermined point.

Another object of the invention is the provision of a novel and simple arrangement whereby a constantly operating power element and a normally stationary element are operatively connected in such a manner that the normally stationary element is picked up and operated without shock to the mechanism and without the noise which accompany these operations with conventional clutches.

The invention contemplates further a novel construction whereby the engagement of the clutch is made self-energizing after a predetermined manual range of force has started the engagement.

A further object of the invention is the provision of novel means for controlling the disengagement of the driving and driven elements in such a manner that the driven element will stop in a predetermined position.

Still another object of the invention is the provision of a novel emergency latch whereby the driven element is positively stopped in a predetermined position, if said driven element develops a tendency to drift beyond a predetermined range after its disengagement from the driving element.

In addition the invention provides a novel and compact arrangement which enables it to replace existing noisy and otherwise objectionable clutches in the machines of which they form a part.

Other objects will appear from the description hereinafter and the features of novelty will be pointed out in the claims.

In the accompanying drawings, which illustrate an example of the invention without defining its limits, Fig. 1 is a sectional elevation of the novel clutch and its associated elements;

Fig. 4 is a fragmentary view similar to Fig. 3 with the parts in different positions;

Fig. 5 is a plan view of Fig. 4;

Fig. 6 is a detail section on the line 6—6 of Fig. 1, and

Fig. 7 is a fragmentary detail view showing a pivot ring and lock spring included in the novel clutch.

Figure 1:
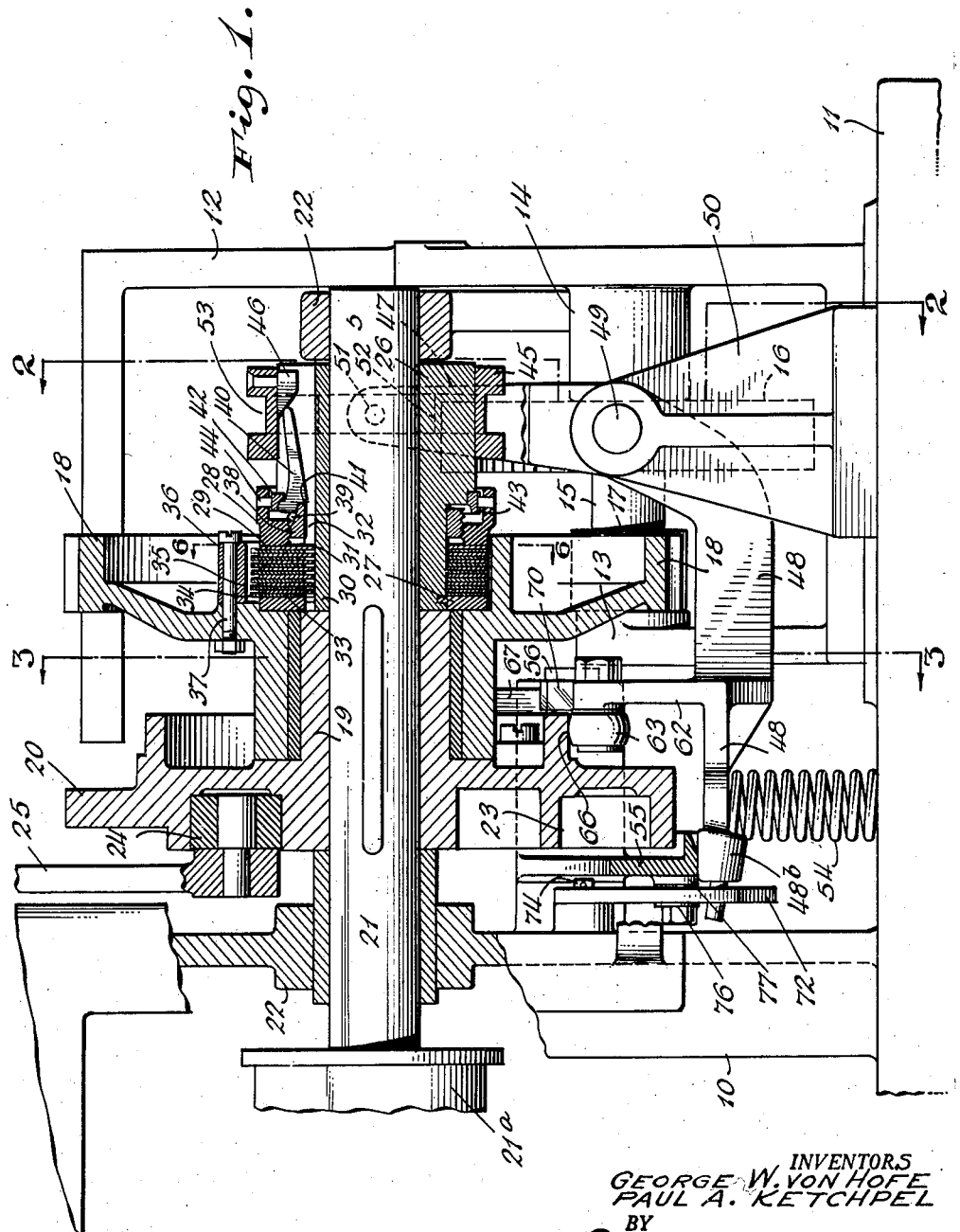

In the illustrated example, 10 represents the frame of the machine, for instance, a labeling machine in which the novel clutch is embodied, and 11 the base on which said frame 10 is mounted.

The frame base 11 carries a sub-frame or casting 12 which is provided with bearings 13 and 14 in which a power shaft 15 is rotatably mounted. Suitably secured on the shaft 15 is a driving gear 16 operatively connected with a motor or other power developing unit whereby said shaft 15 is constantly rotated during a given operative period. The shaft 15 further has fixed thereon a pinion 17 which meshes with a gear 18 constituting the constantly rotating element of the novel clutch.

In the form shown in the drawings, the gear 18 is loosely mounted on the extended hub 19 of a cam 20 which exemplifies the driven element or mechanism controlled by the clutch, said cam 20 being splined to or otherwise fixed upon a shaft 21 journalled in suitable bearings 22. The cam 20 is provided with a cam groove 23 into which a roller 24 projects, said roller being mounted on a member or lever 25 comprising part of the mechanism controlled by the clutch. In the illustrated arrangement the cam 20 and shaft 21 comprise the elements which are intermittently coupled to the power shaft 15 by the novel clutch, the cam groove 23 in cooperation with the roller 24 operating the member 25 which may exemplify a standard reciprocating yoke of existing labeling machines. In such case, the cam 20 through its cam groove 23 and the roller 24 will reciprocate the member 25, which in turn may serve to reciprocate associated parts of the machine, so that the periodical rotation of the shaft 21 is converted into useful reciprocating motion. It will be obvious that this is only an example and that the novel clutch may be combined with and serve to control many other types of mechanism.

The novel clutch further includes a friction clutch unit of the well-known disc type for operatively connecting the constantly rotating gear 18 at will with the shaft 21 and the cam 20 and the elements associated therewith.

The aforesaid friction clutch unit consists of a body or sleeve 26 splined on or otherwise connected with the shaft 21, an end plate 27 fixed to said body or sleeve 26 in any convenient manner and an adjusting ring 28. A plurality of steel or other metallic discs 29 are slidably mounted on a reduced portion 30 of the sleeve or body 26 between the end plate 27 and the adjusting ring 28 and are provided with ears 31 projecting inwardly into keyways 32 formed in said body or sleeve 26 as shown in Fig. 1. A plurality of discs 33 having pre-lubricated surfaces, are loosely mounted between the discs 29 and are provided with lugs or ears 34 on their outer periphery which lugs or ears 34 project outwardly into keyways 35 formed in preferably hardened blocks 36 secured in any suitable manner as by means of bolts 37 to the face of the constantly rotating gear 18. The adjusting ring 28 is in screwthreaded engagement with a ring 38 slidably mounted on the reduced portion 30 of the sleeve or body 26 and provided with keyways 39 for the accommodation of toggle levers 40 which rest in said keyways 39 and include shoulders 41 which contact with the ring 38. A preferably hardened pivot ring 42 is mounted on the enlarged portion of the body or sleeve 21 and includes pivot seats for the toggle levers 40. The ring 42 is provided on its peripheral surfaces with serrations 43 adapted to be engaged by the free end of a lock spring 44. The body of the lock spring rests in a circumferential groove formed in the adjusting ring 28 and the free end of said ring passes through apertures drilled radially through said ring 28 in registry with the aforesaid circumferential groove, into contact with the serrations 43 of the ring 42.

With this arrangement adjustment is provided for any wear which may take place on the respective friction discs 29 and 33. In other words, when the adjusting ring 28 is screwed to position to properly set the discs 29 and 33 with respect to each other, said adjusting ring 29 is locked in its adjusted position by the lock spring 44 in cooperation with the serrations of the pivot ring 42.

The toggle levers 40 of which there may be a predetermined number, such as for instance three levers, are actuated by means of a clutch shifting ring 45 which is slidably mounted on the body or sleeve 26 and is interiorly provided with cams 46 suitably secured in place in operative relation to the toggle levers 40 and in numbers corresponding to the numbers of said levers 40; the cams 46 project into and are slidable in the keyways 32 of the body or sleeve 26.

In the operation of the clutch, the friction discs 29 and 33 may be separated as operatively required, in the same way and by the same means utilized for this purpose in friction disc clutches of conventional and well-known type. As the discs 29 and 33 are operatively separated the toggle levers 40 will thereby be adjusted to the position shown in Fig. 1 wherein the clutch shifting ring 45 occupies a position in which the clutch is disengaged.

The means whereby the clutch shifting ring 45 is slidably operated comprises a fulcrum lever consisting of a yoke 47 and a continuing arm 48, said fulcrum lever being pivoted at 49 on a pedestal 50 mounted upon the base 11 of the machine. The yoke 47 is pivotally connected at 51 with shoes 52 mounted in and arranged to ride in the circumferential groove 53 of the shifting ring 45. A spring 54 is mounted between the arm 48 of the fulcrum lever and the base 11 and serves to maintain the clutch in and return it to its normally inoperative or disengaged position illustrated in Fig. 1.

Figure 2:
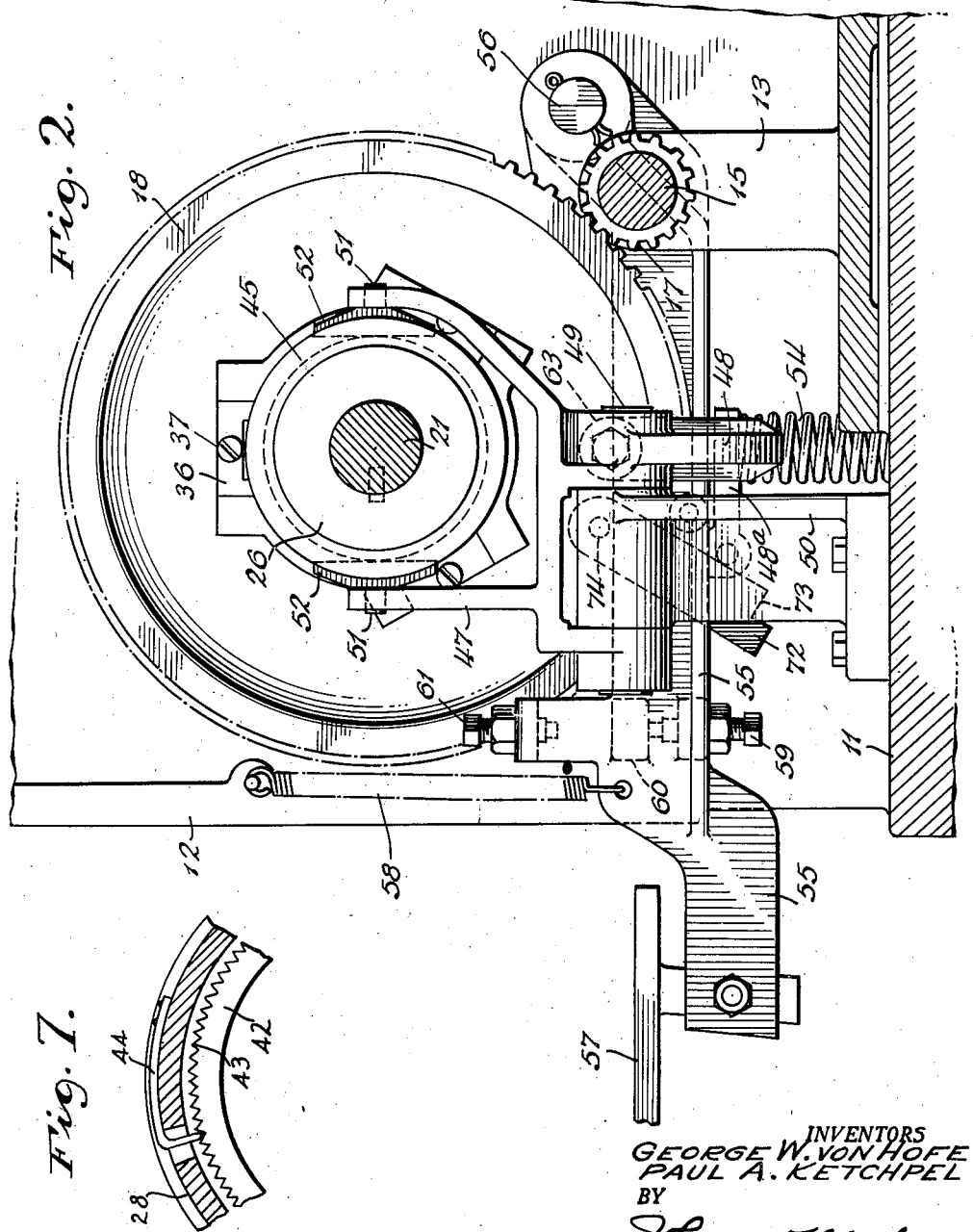
Fig. 2 is a sectional view on the line 2—2 of Fig. 1.

A foot lever 55 is pivoted at 56 upon a pivot pin projecting from a side wall of the frame 10 at the rear of the machine, and extends beneath the shaft 21 to the front of the machine where it is provided with a foot pedal 57 of any conventional type in any well-known way for manual operation of the clutch. The foot lever 55 extends over and in contact with the outer free end of the arm 48 of the fulcrum lever in contact therewith and accordingly is normally urged upward by the spring 54 and by a foot lever spring 58 as illustrated in Fig. 2. The foot lever 55 is provided with a stop screw 59 arranged to engage a lug 60 projecting from the side wall of the frame 10 at the front of the machine to thereby arrest the upward pivotal movement of the foot lever 55 under the influence of the springs 44 and 58. The foot lever 55 further carries a second stop screw 61 arranged to engage said lug 60 to limit the downward pivotal movement of said foot lever 55.

Figure 3:
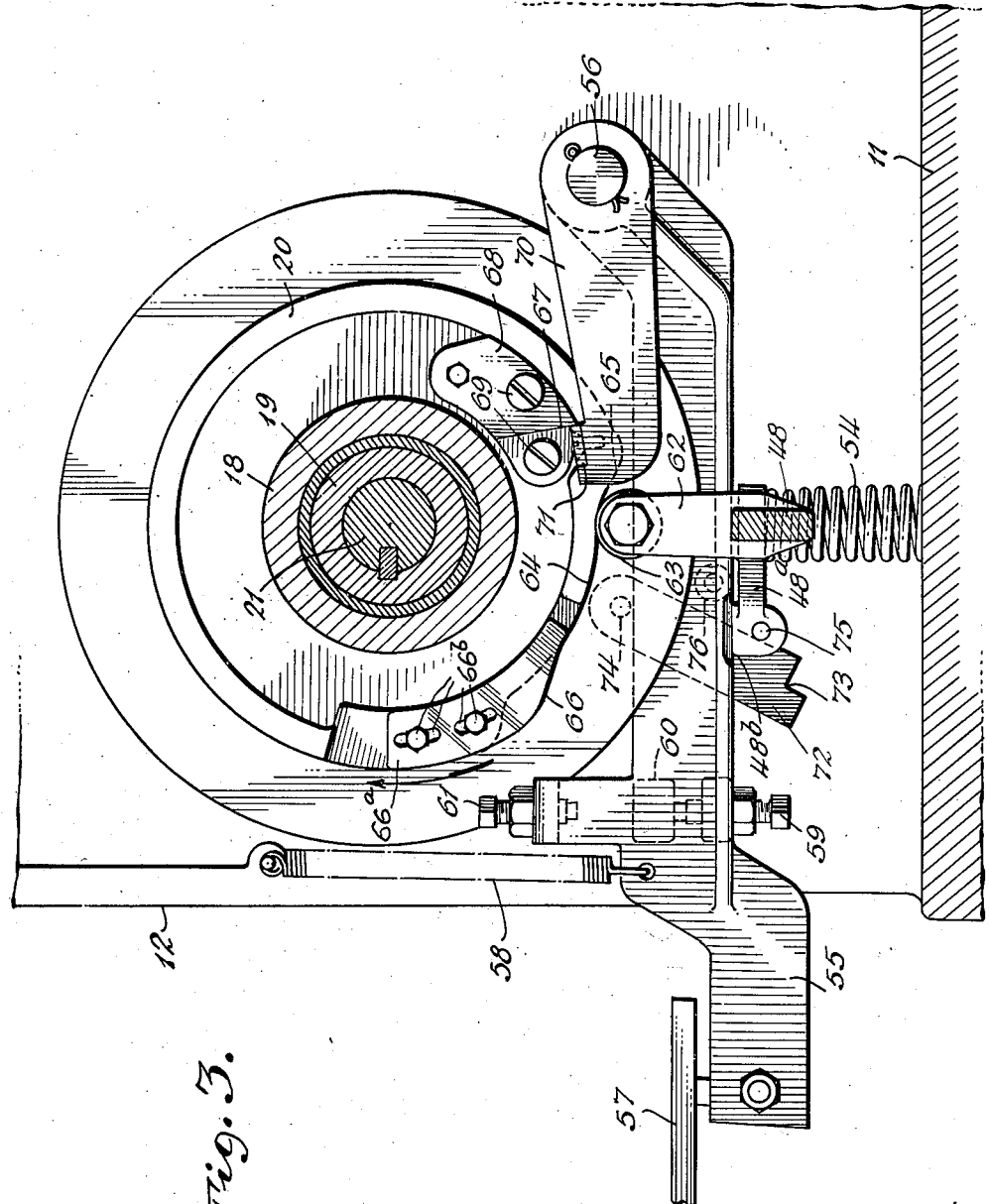
Fig. 3 is a similar view on the line 3—3 of Fig. 1.

As shown in Figs. 2, 3, and 5, the outer end of the arm 48 of the fulcrum lever extends in offset relation to said arm as indicated at 48$^a$ and is provided at said offset portion 48 with a pad 48$^b$ on which the foot lever 55 is arranged to bear. Preferably the contacting surfaces of the lever 55 and the pad 48$^b$ of the arm 48 are hardened to resist wear resulting from the contact of these elements with each other. The arm 48 is purposely offset at 48$^a$ relatively to the pivot 56 to a point at which the movement of the foot lever 55 will produce the required extent of movement in the fulcrum lever 47—48 to result in what may be termed initial engagement of the clutch.

In Fig. 3 of the drawings, the shaft 21 and the cam 20 are shown in their position of rest with the foot lever 55 in its raised position and the outer offset end portion 48$^a$ of the fulcrum lever 47—48 raised against said foot lever 55 which is normal to the position of the mechanism shown in the other views. A member 62 projects upwardly from the arm 48 of the fulcrum lever 47—48 and at its free end carries a roller 63 which is rotatably mounted on said member 62 in engagement with the peripheral surface of the cam 20. The latter is provided with a recessed section 64 from which a swell 65 extends at one end and an inward slope 66 which continues from the other end of said recessed section 64 to the peripheral surface of the cam 20 which is otherwise concentric to the axis of the shaft 21. Instead of making the inward slope 66 an integral part of the cam 20, said slope 66 may constitute a part of a separate member 66$^a$ which is adjustably mounted on said cam 20, for instance, by means of slots and bolts 66$^b$. This arrangement provides an adjustable means for controlling the unclutching of the two shafts in accordance with the speed of the machine in which the clutch is embodied.

When the operator steps on the foot treadle 57 the foot lever 55 is forced downwardly and develops a downward pressure on the pad 48$^b$ of the offset section 48$^a$ of the fulcrum lever 47—48 and thereby pivotally swings the latter on its pivot 49 to swing the yoke 47 toward the left in Fig. 1. This causes the shifter ring 45 to be correspondingly moved toward the left on the body or sleeve 26 in Fig. 1 and carries with it the cams 46. The latter accordingly exert a camming action on the toggle levers 40 and swing the latter on the pivot ring 42 in a direction to cause the shoulders 41 of said levers 40 to press the rings 38 and 28 to the left in Fig. 1 and thereby bring the friction discs 29 and 33 into initial driving engagement with each other. This initial engagement of the clutch by manual operation as described, is sufficient to bring about a rotation of the cam 20 to an extent to cause the swell 65 of the cam 20 to press the roller 63 and the member 62 downwardly whereby the fulcrum lever 47—48 is pivotally actuated to complete the engagement of the clutch. In other words, subsequent to the aforesaid initial engagement of the clutch by manual operation, the mechanism is self-energizing so that only a minimum of manual force is required to shift the clutch to its operative position.

When operated as a single revolution clutch the foot lever 55 is permitted to rise soon after the aforesaid initial engagement is completed, by lifting the foot of the operator from said foot lever 55. After the shaft 21 and the cam 20 have completed about ⅞ of a revolution, the clutch is permitted to gradually disengage, such operation being predetermined by the location of the inward slope 66 on the peripheral surface of said cam 20. In other words, the roller 63 will roll inwardly on said slope 66 and will finally be in rolling engagement with the surface of the recess 64 of said cam 20. The fulcrum lever 47—48 will thereby be pivotally actuated in a manner to shift the clutch shifting ring 45 to the right in Fig. 1 and thus relieve the toggle levers 40 from the camming action of the cams 46 and permit the friction discs 29 and 33 to be forced apart by the action of the previously mentioned springs whereby the clutch is shifted to its inoperative position. The complete disengagement of the clutch, or in other words, the shifting thereof to its inoperative position, is effected sufficiently far in advance so that the cam shaft 21 will drift to and stop in its intended position of rest. The aforesaid disengagement of the clutch may be efficiently controlled by setting the member 66ª and its inward slope 66 in the proper position dependent upon the speed of the machine. A brake drum 21ª may be located on the shaft 20 and actuated by a conventional brake, which has not been illustrated, to control the deceleration of the shaft when the machine of which the clutch forms a part is run at high speeds.

To eliminate the possibility that the clutch may unintentionally become self-repeating by reason of the cam 21 drifting beyond the stop position to a sufficient extent to cause the swell 65 by acting on the roller 63 to actuate the fulcrum lever 47—48, suitable means is included for positively preventing any unintentional over-run of the cam 20. The aforesaid means in its illustrated form comprises a stop or lip 67 forming part of a preferably hardened steel or other metallic block 68 suitably secured to the face of the cam 20 as for instance by means of bolts 69. The lip or stop 67 is designed to cooperate with a latch combined with the foot lever 55 and consisting for instance of an arm 70 movable with the foot lever 55 and provided at its free end with a preferably hardened inset 71 which constitutes a locking nose against which the projection or lip 67 is designed to abut when the parts are in the position illustrated in Fig. 3 of the drawings. The arm 70 with its locking nose 71 is so proportioned that the latch will engage the lip or projection 67 and stop further rotation of the cam 20 and cam shaft 21 when the foot lever 55 is in the upper position shown in Fig. 3, and so that the locking nose 71 will lie outside of the path of the lip or projection 67 when the foot lever 55 is moved downwardly to a sufficient extent to start the initial rotation of the cam 20 and shaft 21 as illustrated in Fig. 4 of the drawings.

It is desirable to relieve the operator of the necessity for exerting any material downward force on the foot treadle 57 to maintain the foot lever 55 in its depressed position when continuous operation of the mechanism controlled by the clutch is desired. The novel arrangement accordingly includes a latching member 72 provided with a notch 73 and pivotally mounted on a pin 74 which may be suitably located on the frame 10, the arrangement being such that the latching member 72 will swing by gravity into its operative position. The notch 73 of the latching member 72 cooperates with a pin 75 projecting from and carried by the offset section 48ª of the fulcrum lever 47—48. With this arrangement the notch 73 of the latching member 72 will automatically swing over the pin 75 when the foot lever 55 is depressed to correspondingly depress the member 48 of the fulcrum lever 47—48. As a result the clutch will be maintained in its operative position to bring about an operation of the mechanism with which it is associated as long as the notch 73 of the latching member 72 remains in engagement with the pin 75.

The clutch further includes means whereby the latching member 72 is operated automatically to shift its notch 73 out of engagement with the pin 75 to thereby release the fulcrum lever 47—48 and bring about a disengagement of the clutch or a shifting thereof to its inoperative position. In the illustrated example this means consists of a roller 76 located in registry with the latching member 72 and rotatably mounted on a boss 77 formed on the foot lever 55. Thus when it is desired to release the fulcrum lever 47—48 from the locking effect of the latch member 72, it is simply necessary for the operator to permit the foot lever 55 to swing upwardly under the influence of the spring 58 and to thereby correspondingly raise the roller 76. The latter accordingly will engage the latch member 72 and will force it to swing on its pivot 74 toward the left as is shown by dotted lines in Fig. 4 of the drawings. The notch 73 of the latch member 72 will thereby be moved out of engagement with the pin 75 and accordingly will permit the spring 54 by acting on the member 48 of the fulcrum lever 47—48 to adjust the clutch to its inoperative position as soon as the roller 63 enters the recessed section 64 of the cam 20. With this arrangement, once the clutch has been engaged or shifted to its operative position, it is simply necessary for the operator to exert the slight force necessary to maintain the foot lever 55 in its depressed position in which the latch member 72 locks the fulcrum lever 47—48 in a manner to maintain the clutch in its engaged or operative position.

The novel clutch is simple in construction and of maximum efficiency and operation and may be incorporated in existing machines or in association with various types of mechanisms without difficulty.

Various changes in the specific forms shown and described may be made within the scope of the claims without departing from the spirit of the invention.

We claim:

1. A clutch comprising a power shaft arranged for operative connection with a source of power, a driving pinion fixed on said shaft, a countershaft, a cam including an extended hub fixed on said countershaft, a gear loosely mounted on said extended hub and meshing with said pinion, a sleeve fixed on said countershaft, an end plate carried by said sleeve, a plurality of clutch discs adjacent said end plate, alternate discs being connected with said sleeve and said gear respectively, an adjusting ring slidably mounted on said sleeve in engagement with a terminal clutch disc, a pivot ring mounted on said sleeve, toggle levers pivotally connected wth said pivot ring and having shoulders in engagement with said adjusting ring, a clutch shifting ring slidably mounted on said sleeve, cams carried by said ring in operative relation to said toggle levers, a pivoted fulcrum lever operatively connected with said clutch shifting ring, a pivoted foot lever extending transversely to and in engagement with said fulcrum lever and arranged to be manually depressed to thereby pivotally operate said fulcrum lever and slidably shift the clutch shifting ring whereby said cams pivotally actuate said toggle levers and the shoulders thereof force said adjusting ring against said clutch discs to adjust the latter into initial driving engagement whereby said countershaft is connected with said power shaft, and means acted on by said cam to continue the pivotal operation of said fulcrum lever to thereby automatically complete the driving engagement of said clutch discs.

2. The combination of a power shaft, a driving pinion on said power shaft, a countershaft, a cam fixed on said countershaft, a gear rotatable relatively to said countershaft and meshing with said pinion, a plurality of clutch discs alternately connected with said gear and said countershaft, manually operated means for shifting said clutch discs into initial driving engagement to initially operate said countershaft and cam, means acted on by said cam to automatically complete the driving engagement of said clutch discs, latching means controlled by said manually operated means for maintaining said clutch discs in driving engagement, and means whereby said latching means is automatically adjusted to an inoperative position.

3. The combination of a power shaft, a driving pinion on said power shaft, a countershaft, a cam fixed on said countershaft, a gear rotatable relatively to said countershaft and meshing with said pinion, a plurality of clutch discs alternately connected with said gear and said countershaft, manually operated means for shifting said clutch discs into initial driving engagement to initially operate said countershaft and cam, means acted on by said cam to automatically complete the driving engagement of said clutch discs, a locking projection carried by said cam, and a latch member movable with said manually operated means arranged to co-operate with said locking projection to prevent excessive drifting of said countershaft and cam subsequent to the disengagement of said clutch discs whereby said clutch is prevented from being unintentionally self-repeating.

4. The combination of a power shaft, a driving pinion on said power shaft, a countershaft, a cam fixed on said countershaft, a gear rotatable relatively to said countershaft and meshing with said pinion, a plurality of clutch discs alternately connected with said gear and said countershaft, manually operated means for shifting said clutch discs into initial driving engagement to initially operate said countershaft and cam, means acted on by said cam to automatically complete the driving enggement of said clutch discs, a locking projection carried by said cam, a latch member movable with said manually operated means arranged to co-operate with said locking projection to prevent excessive drifting of said countershaft and cam subsequent to the disengagement of said clutch discs whereby said clutch is prevented from being unintentionally self-repeating, and an adjustable device carried by said cam whereby the disconnection of the power member from the driven member may be controlled in dependence upon the speed of operation.

5. The combination of a power operated member, a normally stationary driven member, a clutch comprising co-operating devices connected respectively with said power operated member and said driven member, said devices being normally disconnected from each other, controlling means for connecting said normally disconnected devices with each other whereby said power operated member is operatively coupled to said driven member to transmit power thereto, and for restoring said normally disconnected devices to the normal disconnected position to uncouple said power operated member from said driven member, and adjustable means arranged to be set in an operative position in dependence upon the speed and load of the machine to act on said controlling means at a point predetermined by said speed and load and calculated so that said driven member will drift to its intended position of rest.

GEORGE W. von HOFE.
PAUL A. KETCHPEL.